D. V. GRACE AND J. S. ELLIOTT, OF COSHOCTON, OHIO.

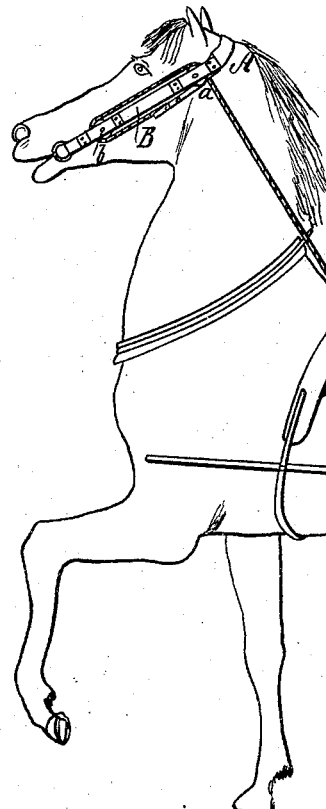
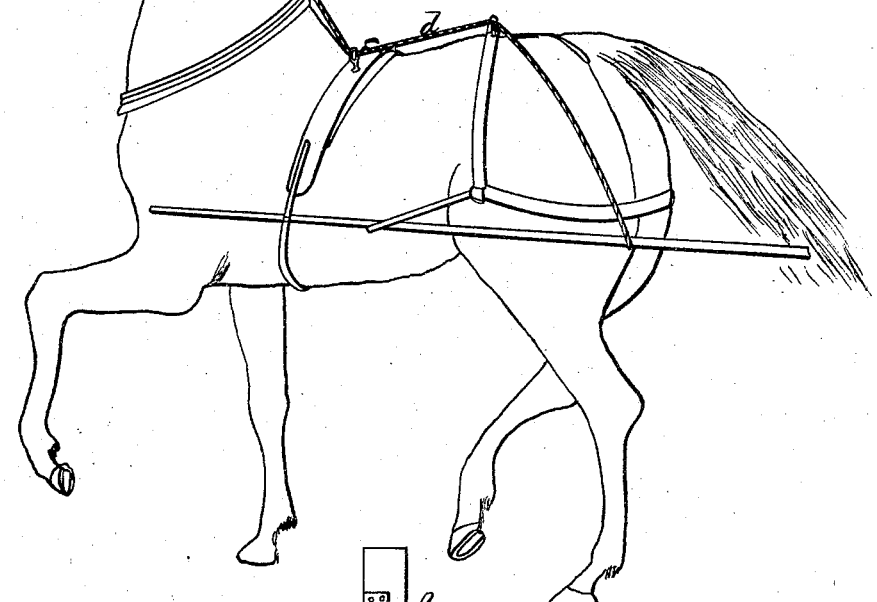

Letters Patent No. 86,662, dated February 9, 1869.

IMPROVED BRIDLE FOR PREVENTING HORSES FROM KICKING.

The Schedule referred to in these Letters Patent and making part of the same.

*To all whom it may concern:*

Be it known that we, D. V. GRACE, of Coshocton, in the county of Coshocton, and State of Ohio, and J. S. ELLIOTT, of Coshocton, in the county of Coshocton, and State of Ohio, have invented new and useful Improvements in Bridles; and we do hereby declare that the following is a full and exact description of the same, reference being had to the accompanying drawings, and to the letters of reference marked thereon.

This invention relates to certain improvements in bridles, and consists in a novel arrangement of pulleys and lines, by means of which hard-mouthed or runaway horses are easily controlled, and vicious ones prevented from kicking, as will be fully described hereinafter.

Figure 1 represents a view of our improved arrangement to prevent kicking, as applied to a horse, and Figure 2, a view of our arrangement to prevent horses from running away.

In the drawings—

A represents the head-piece of a bridle, to both sides of which are attached the pulleys *a a*, as shown.

B represents the cheek-straps, to which also the pulleys *b b* are attached, just above the bit, or connected to the bit.

C represents the back-band, which is constructed in the usual manner.

When it is desired to drive a horse which is in the habit of running away, or one unusually hard-mouthed, the following arrangement is made:

One end of a line, *c*, is attached securely to the back-band, as shown in fig. 2; the other end is first passed forward through the upper pulley, thence downward, and back through the lower pulley, from which point it passes through the ordinary ring in the back-band, and is carried to the driver.

This arrangement may be used alone, or in connection with reins arranged in the ordinary manner, in which latter case the arrangement described would be used only in case of emergency.

When it is desired to prevent a vicious animal from kicking, the safety-line *d*, fig. 1, is securely fastened to the head-piece of the bridle, from which point it passes downward and forward through the lower pulley, from thence upward and back through the upper pulley, then through the ring in the back-band, and also through a ring in the crupper, near the hip-straps, from which point it passes to the shaft upon one side, and is securely fastened thereto.

The length of this line should be adapted to the size of the horse.

By the arrangement described, the effort of an animal to kick is perfectly frustrated, for, as soon as the hips are raised in the slightest degree, the line in made taut, and its head is consequently drawn up. Of course it is impossible for an animal to kick with its head elevated.

This arrangement may be used with two horses, the rear end of the line being attached to the pole.

These lines may be made with snap-hooks, or buckles, for the purpose of being readily and conveniently attached to the proper points.

When the safety-lines are used for driving-purposes, it will be necessary, of course, to attach one to each side of the bridle; but when used to prevent kicking, one will be sufficient, although two may be used, if desired.

By the arrangement herein described, a powerful check upon the animal is secured, by means of which even the most vicious may be easily controlled.

Having thus fully described our invention,

What we claim as new, and desire to secure by Letters Patent, is—

The kicking-attachment, in combination with the bridle A B, all constructed and arranged as described.

This specification signed and witnessed, this 4th day of May, 1868.

D. V. GRACE.
J. S. ELLIOTT.

Witnesses:
LUTHER L. CANTWELL,
JAMES L. CAMPBELL.